Patented July 18, 1950

2,515,742

UNITED STATES PATENT OFFICE 2,515,742

OIL BASE DRILLING MUD

Ernest F. Snyder, Long Beach, Calif.

No Drawing. Application July 5, 1947,
Serial No. 759,305

2 Claims. (Cl. 252—8.5)

This invention relates to oil base drilling fluids of the type in which, in addition to the oil base and weight material, the fluid contains asphalt as a plastering agent and preferably also lime (CaO) or slack lime (Ca(OH)$_2$). Oil base drilling fluids of this type are described, for example, in United States Patent No. 2,356,776 issued August 29, 1944, to Miller.

It is the general object of the present invention to provide an oil base drilling mud or a powdered mixture for producing an oil base drilling mud having an improved property for maintaining the ingredients in suspension.

An oil base drilling fluid, in addition to including ingredients designed for plastering or sealing off formations encountered during drilling, must also include material for increasing the weight of the fluid. It has been common to use for such weight material different forms of calcium carbonate (CaCO$_3$). Thus, for example, crushed limestone, oyster shells, etc., have been employed as the weighting material for oil base drilling fluids. Previous to the present invention, however, all oil base drilling fluids have exhibited a pronounced tendency to settle out the weight material which is included therein.

The present invention is predicated upon the discovery that an oil base drilling fluid of improved properties may be produced through the use of a special type of calcium carbonate, this special type of calcium carbonate being a precipitated form derived from chemical reactions in which the calcium carbonate is formed and precipitated from solution. A common source of calcium carbonate suitable for use in accordance with the present invention is that derived as a precipitate during water softening operations. In water softening operations there is added to hard water either calcium hydroxide or sodium carbonate (soda ash), with the resulting precipitation of calcium carbonate (CaCO$_3$) and also in certain cases barium sulphate (BaSO$_4$). I have found that these precipitates of weight material are exceptionally suitable for use in oil base drilling fluids. A partial explanation for the value of this form of weight material over those generally used lies in the fact that the precipitated material is generally finer than the weighting material ordinarily used. Precipitated calcium carbonate from water softening operations will generally pass a 300 or 400 mesh screen whereas it is uneconomical to attempt to grind limestone and the like to a fineness beyond about a 200 mesh screen. There exist, however, other physical characteristics of the precipitated material which seem to facilitate the suspension of such material in an oil base drilling fluid.

In accordance with the present invention, the desired oil base drilling mud may be produced at the well in which it is to be used by adding the other ingredients separately to the oil base, but the invention also comprehends that all of the ingredients of the oil base drilling fluid of the present invention except the oil base may be admixed together in a powdered form in proper proportions to produce a desired drilling fluid merely by adding this prepared powdered mixture to the oil base. By so preparing a powdered mixture it is possible to take advantage of the energy of certain chemical reactions resulting when the materials are added to the oil base to facilitate distributing the ingredients in the oil base.

The present invention, together with various further objects and advantages of the invention, will be more fully understood from the following descriptions of the preferred form or forms of the invention.

In one form of the invention, I employed the precipitated material from a water softening operation which consisted mainly of calcium carbonate and was all adapted to pass 300 or 400 mesh screen. To this weight material there are added suitable ingredients for providing plaster properties and gel strength to the mud fluid. Particularly where the drilling fluid is to be used in wells having high bottom hole temperatures, I prefer to employ a blown type of asphalt having penetrations of around 6 to 14 at 25° C. with a melting point of around 310° to 260° F. Asphalts of this type may be produced by technique well known in the oil industry by careful selection of stocks and blowing technique and are exceptionally rubbery in nature and have characteristics which adapt them especially for imparting proper gel strength and plastering properties to oil base drilling fluids. There is also preferably added as an additional agent in imparting plastering properties and gel properties to the oil base fluid an ingredient such as calcium oxide or calcium oxide slacked partially with water to form calcium hydroxide. Such an agent by imparting gel properties acts to inhibit settling of the weight material and is therefore a settling inhibitor. In producing a powdered preparation in accordance with the present invention, these ingredients may, for example, be ground together in a hammer mill, or the asphalt with a small portion of the precipitated calcium carbonate weight material may be ground into a powder and then mixed with the remainder of the powdered weight material and calcium oxide or hydroxide. A preferred powdered mixture may be one which contains, for example, 66% by weight of the weight material or precipitated calcium carbonate, 26% by weight of the blown asphalt or mineral rubber, and 8% by weight of calcium oxide.

In order to produce an oil well drilling fluid from such a powdered composition, all that is required is to add thereto a suitable quantity of oil. For example, to 100 parts of the powdered composition thus prepared, there may be added 100 parts of a suitable oil such as stove oil or gas oil. In certain cases, it may be desirable to add a small amount of water to partially slack the quick lime contained in the composition.

The powdered preparation produced as described above has the advantage that it provides a very convenient means for supplying the oil well driller with the properly prepared and proportioned mixture for making the oil base drilling fluid. The prepared mixture has the additional advantage that the quick lime contained therein, when added to the oil and on the addition of the small amount of water described above, reacts rather violently so as to assist in dispersing the ingredients in the oil.

In other examples of the present invention, the oil base drilling fluid is produced by adding all the ingredients separately at the well, the asphalt being preferably first added to the oil base drilling fluid and thereafter the quick lime and finally the weight material.

By means of the present invention, I have successfully produced oil well drilling fluids which may be used safely in oil wells under conditions where prior oil well drilling fluids would set up in the well hole because of excessive settling of the weight material contained therein.

While the particular forms of the invention herein described are well adapted to carry out the objects of the present invention, various modifications and changes may be made, and this invention includes such modifications and changes as come within the scope of the appended claims.

I claim:

1. An oil base drilling fluid comprising an oil, a finely divided weight material, a settling inhibitor selected from the group consisting of calcium oxide and partially slaked calcium oxide, and an asphalt as a plastering agent, said drilling fluid being characterized by the fact that the weight material is essentially a precipitated calcium carbonate from a water softening operation adapted to pass a 300 mesh screen.

2. An oil base drilling fluid comprising an oil, a finely divided weight material, a settling inhibitor selected from the group consisting of calcium oxide and partially slaked calcium oxide, and asphalt having a melting point of 260° to 310° F. and a penetration of 6 to 14 at 25° C., the drilling fluid being characterized by the fact that the weight material employed is a precipitated calcium carbonate, the produce of a water softening operation which is adapted to pass a 300 mesh screen.

ERNEST F. SNYDER.

REFERENCES CITED

The following references are of record in the file of this patent:

UNITED STATES PATENTS

| Number | Name | Date |
| --- | --- | --- |
| 2,220,681 | Huisman | Nov. 5, 1940 |
| 2,223,027 | Dawson | Nov. 26, 1940 |
| 2,356,776 | Miller | Aug. 29, 1944 |
| 2,363,499 | Campbell | Nov. 28, 1944 |
| 2,393,165 | Hoeppel | Jan. 15, 1946 |